United States Patent [19]

Matsumoto et al.

[11] 4,352,383
[45] Oct. 5, 1982

[54] HEAVY DUTY PNEUMATIC RADIAL TIRE

[75] Inventors: Kenji Matsumoto, Kodaira; Yasuo Suzuki, Akigawa, both of Japan

[73] Assignee: Bridgestone Tire Co., Ltd., Tokyo, Japan

[21] Appl. No.: 277,374

[22] Filed: Jun. 25, 1981

[30] Foreign Application Priority Data

Jul. 2, 1980 [JP] Japan ................................ 55-89257

[51] Int. Cl.³ ............................ B60C 3/00; B60C 9/08
[52] U.S. Cl. ............................ 152/352 R; 152/354 R; 152/362 R
[58] Field of Search .......... 152/352 R, 352 A, 353 R, 152/353 C, 353 G, 354 R, 354 RB, 361 R, 361 FP, 361 DM, 362 R, 362 CS

[56] References Cited

U.S. PATENT DOCUMENTS

| 3,789,900 | 2/1974 | Verdier | 152/361 R |
| 3,902,542 | 9/1975 | Imamura et al. | 152/374 |
| 4,077,454 | 3/1978 | Miyoshi et al. | 152/354 R |
| 4,086,948 | 5/1978 | Suzuki et al. | 152/354 R |
| 4,271,890 | 6/1981 | Pommier | 152/352 R |

Primary Examiner—Edward C. Kimlin
Assistant Examiner—Lois E. Boland
Attorney, Agent, or Firm—Sughrue, Mion, Zinn, Macpeak & Seas

[57] ABSTRACT

A heavy duty pneumatic radial tire having a high resistance against separation of belt end portion and separation of turn-up end of carcass ply in the beak portion is disclosed. This tire has a particularly limited carcass line defined by (1) the height of the intersecting point of a radial line, which contacts with the carcass in the inside of the bead core, with the carcass from a base line, which passes through the center of the bead core in a direction parallel to the rotation axis of the tire, (2) the maximum width of the carcass, (3) the vertical distance of the maximum width point of the carcass from the base line, and (4) the distance of the maximum width point of the carcass from the radial line.

1 Claim, 2 Drawing Figures

U.S. Patent    Oct. 5, 1982    4,352,383
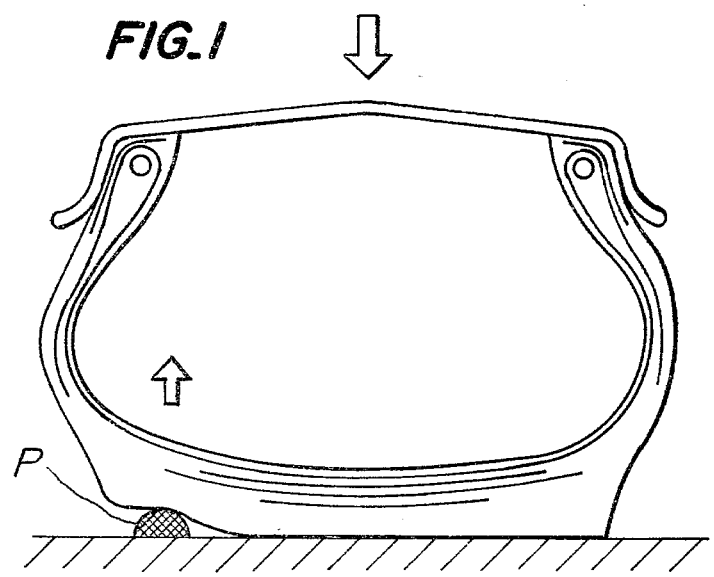
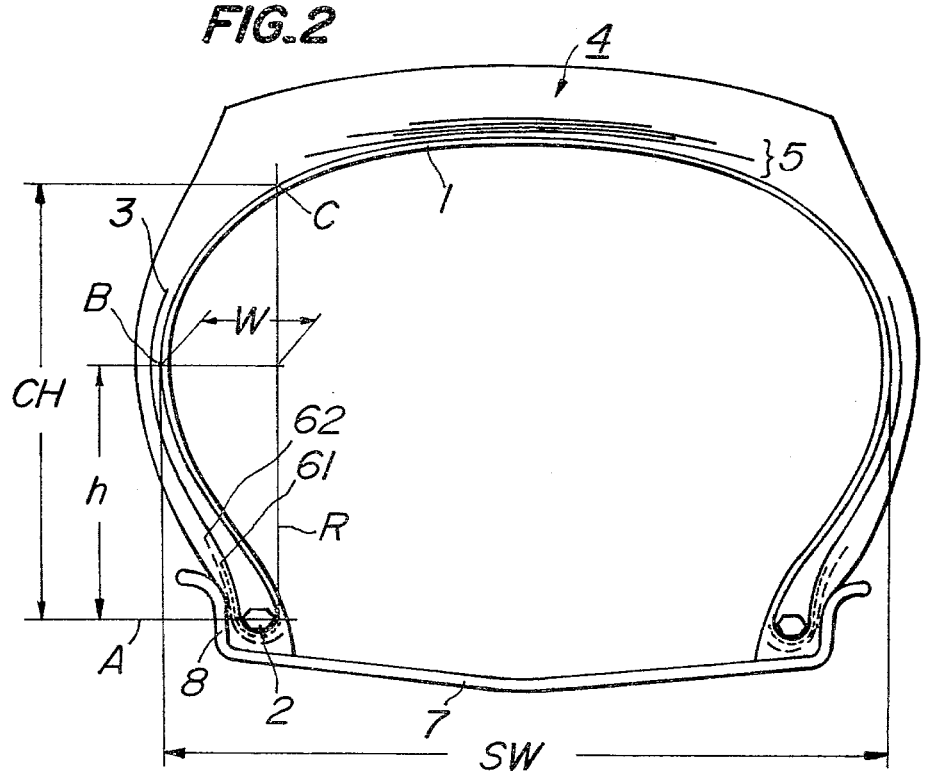

HEAVY DUTY PNEUMATIC RADIAL TIRE

BACKGROUND OF THE INVENTION

The present invention relates to a heavy duty pneumatic radial tire, and more particularly it relates to a heavy duty pneumatic radial tire adapted to be used in the running on off road conditions.

A conventional heavy duty pneumatic radial tire for running on off road conditions has serious drawbacks that, when the tire rides on a projection formed on a road, separation of belt end portion occurs and separation of the turn-up end of the carcass ply occurs in the bead portion.

In order to prevent separation of belt end portion, the belt portion is wrapped with a rigid rubber and further with a flexible rubber, or a metal cord having a relatively large elongation is used in the belt to relax the stress at the belt end portion. However, the above described method is expensive due to the complicated arrangement of material members, but the resistance against the separation is not satisfactorily improved.

While, in order to prevent separation of turn-up end of carcass ply in the bead portion, the number of chafers having organic fiber cords, such as nylon cord and the like, is increased, or a rigid stiffener ruber is used to improve the durability of the bead portion. However, this method also is expensive due to the use of a large amount of material members, strain and stress are concentrated to the vicinity of the reinforced portion, and performance of the tire is decreased.

The present invention provides a carcass line, which has not the above described drawbacks and can advantageously prevent separation of belt end portion and separation of turn-up end of carcass ply in the bead portion.

BRIEF DESCRIPTION OF THE DRAWING

For a better understanding of the invention, reference is taken to the accompanying drawings, wherein:

FIG. 1 is an explanative view illustrating a deformed state of the shoulder portion of a heavy duty pneumatic radial tire when the tire rides on a projection; and FIG. 2 is a cross-sectional view of the heavy duty pneumatic radial tire according to the present invention.

DESCRIPTION OF THE PREFERRED EMBODIMENT

Deformation of a tire during the running on off road is, for example, as follows. When the ground-contact area of a tire rides on a projection P on a road by the portion near the end of one side of the tread as illustrated in FIG. 1, large amounts of strain and stress are concentrated to the vicinity of the belt end portion and promote separation of belt end portion. The causes of the separation of belt end portion are, firstly, stress and strain, which are repeatedly caused at the vicinity of the belt end portion in every ground-contact time of the tire due to the load applied to the tire; and secondly, stress and strain, which are additionally applied to the belt end portion by the projection P on road.

Accordingly, the stress and strain due to the above described load can be suppressed by producing a tire having a large flexure in the radial direction and having a large ground-contact length. The stress and strain due to the projection can be suppressed by producing a tire flexible against the local deformation.

Further, failure of bead portion is highly influenced by the stress and strain due to compression formed along the direction of carcass. After various investigations, the inventors have found out that failure of the bead portion is highly influenced by the angle formed by the rotation of the bead portion when the bead portion is fallen down towards the rim flange corresponding to the load from the inflated state of the tire formed by applying an internal pressure, and that the suppression of this deformation is effective for preventing separation of carcass ply in the bead portion.

In the present invention, the above described discovery was applied to pneumatic radial tire, and a flat carcass line was firstly selected so as to obtain a large flexure in the radial direction of a tire, and further the flat carcass line was made into such carcass line that, when the tire was assembled on a rim having a flange rising substantially perpendicular to the rotation axis of the tire, the fall down angle of the bead portion was small. The inventors have further made various investigations with respect to the above described carcass line in order to find out a condition capable of preventing at the same time separation of belt end portion and separation of turn-up end of carcass ply in the bead portion. As results, the inventors have found out that a carcass line, which satisfies the following conditions in the assembled state of the tire on the rim, is particularly effective. That is, in FIG. 2, (a) the ratio of SW/CH is within the range of $1.6 < SW/CH < 2.0$, wherein SW is the maximum width of the carcass and CH is the height of the intersecting point C of a radial line R, which contacts with the carcass in the inside of the bead core, with the carcass from a base line A, which passes through the center of the bead core in a direction parallel to the rotation axis of the tire; and (b) the ratio of h/CH is within the range of $0.55 < h/CH < 0.61$ and the ratio of W/CH is within the range of $0.23 < W/CH < 0.28$, wherein h is the vertical distance of the maximum width point B of the carcass from the base line A, and W is the distance of the maximum width point B from the radial line R.

The present invention is effective to relatively flat tire having a ratio of SW/CH of higher than 1.6, which have a high side rigidity. However, when a tire is excessively flat and has a ratio of SW/CH of not lower than 2.0, the tire is not suitable to be used as a heavy duty tire.

When the ratio of h/CH is not higher than 0.55, the relative thickness of rubber at the shoulder portion is large, and therefore the rubber is unbalanced in the heat generation and heat dissipation, and is insufficient in the resistance against separation of belt end portion. When the ratio of h/CH is not lower than 0.61, the tire is large in the deformation and in the concentration of stress and strain at the belt end portion, and is apt to have a large fall down angle of the bead portion. That is, the ratio h/CH of not lower than 0.61 is disadvantageous against both separation of belt end portion and separation of turn-up end of carcass ply in the bead portion.

When the ratio of W/CH is not higher than 0.23, large amounts of stress and strain due to compression are concentrated to the bead portion. When the ratio is not lower than 0.28, the growth of shoulder portion is excessively larger than the growth of tread center at the inflation of the tire by applying an internal pressure, and separation of belt end portion is apt to occur.

Only when the above described three conditions are satisfied at the same time, both separation at the belt end portion and separation of turn-up end of carcass ply in the bead portion, which always occur in a heavy duty pneumatic radial tire running on off road conditions, can be prevented. Accordingly, the durability of heavy duty pneumatic radial tire can be remarkably improved.

The following example is given for the purpose of illustration of this invention and is not intended as a limitation thereof.

The present invention will be exemplified by a radial tire for construction vehicle, which has a tire size of 33.25 R35. FIG. 2 illustrates the cross-sectional shape of the tire. In the tire, a carcass ply 1 is turned up around a bead core 2 from the inside to the outside, and the turn-up end is represented by the numeral 3. A belt 5 is arranged between the carcass ply 1 and a tread 4.

The belt 5 is formed of a plurality of metal cord layers, the cords of which are inclined at a relatively small angle with respect to the equatorial plane of the tire and crossed with each other.

In the bead portion, reinforcing layers 61 and 62 having metal cord or fiber cord are arranged along the outer side of the turn-up portion of the carcass ply. A rim 7, on which the tire is assembled, has a base portion inclined at an angle of about 5° with respect to the rotation axis of the tire and has a flange 8 rising from the base portion in a direction substantially perpendicular to the rotation axis and has a size of 27×37.

In FIG. 2, the mark A represents a base line which passes through the center of the bead core in a direction parallel to the rotation axis of the tire. The mark B represents the maximum width point of the carcass. The mark C represents an intersecting point of a radial line R, which contacts with a carcass ply 1 in the inside of the bead core 2, with the carcass ply 1. In the tire shown in FIG. 2, the height CH of the point C from the base line A is 495 mm, the vertical distance h of the point B from the base line A is 289 mm, the distance W of the point B from the radial line R is 136 mm, and the maximum width SW of the carcass ply 1 is 847 mm. Therefore SW, h, W and CH have the following relations: SW/CH=1.71, h/CH=0.584 and W/CH=0.275.

The above described tire for construction vehicle, which has a tire size of 33.25 R35 and the above described carcass shape, is lower by about 30% in the average strain energy at the belt end portion and by about 20% in the average strain at the bead portion than conventional tires for construction vehicle. In a practical road test under an overload, the above described tire of the present invention the separation of the belt end portion and the separation of the bead portion is noticeably small.

What is claimed is:

1. In a heavy duty pneumatic radial tire having a carcass consisting of at least one cord ply, which is arranged in the substantial radial plane of the tire, the outer periphery of said carcass being surrounded with a belt consisting of at least 2 metal cord layers, the cords of which are inclined at a relatively small angle with respect to the equatorial plane of the tire and crossed with each other, to reinforce rigidly just under the tread and to form a reinforced crown portion; and reinforced bead portions at both ends of the carcass, each of said reinforced bead portions being formed by turning up the end portion of the carcass ply around the bead core from the inside to the outside together with a rubber stock arranged between the bead core and the carcass ply; and said bead portions being assembled on a rim having a flange rising substantially perpendicular to the rotating axis of the tire, the improvement comprising said tire having, in its assembled state on the rim, (a) a ratio of SW/CH being within the range of $1.6 < SW/CH < 2.0$, wherein SW is the maximum width of the carcass, and CH is the height of the intersecting point C of a radial line R, which contacts with the carcass in the inside of the bead core, with the carcass from a base line A, which passes through the center of the bead core in a direction parallel to the rotation axis of the tire; and (b) a ratio of h/CH being within the range of $0.55 < h/CH < 0.61$, and a ratio of W/CH being within the range of $0.23 < W/CH < 0.28$, wherein h is the vertical distance of the maximum width point B of the carcass from the base line A, and W is the distance of the maximum width point B from the radial line R.

* * * * *